March 14, 1944.  H. HALLERSTROM ET AL  2,344,354
VALVE CONSTRUCTION
Filed Jan. 16, 1942
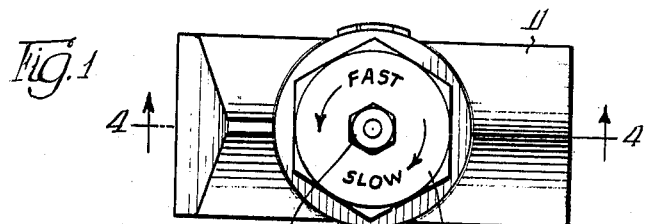
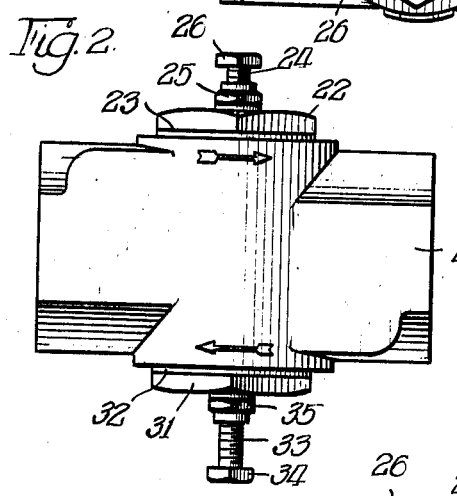
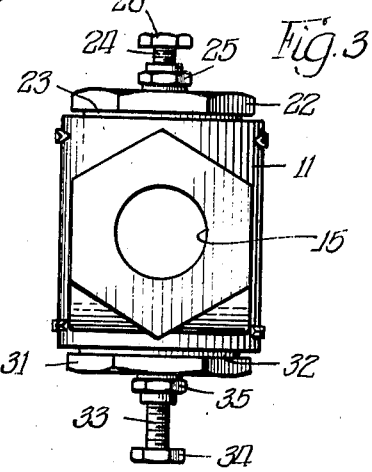
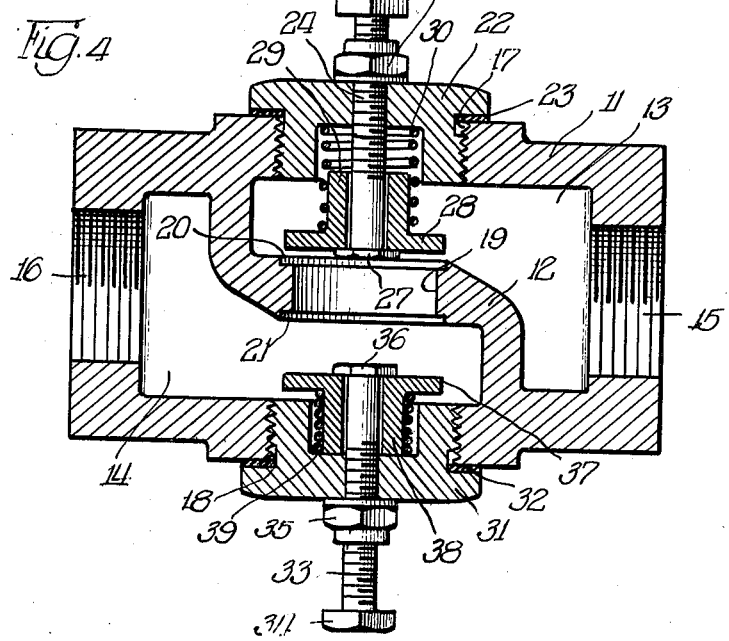
INVENTORS.
Harold Hallerstrom,
Charles Letsche,
BY Wilkinson, Huxley, Byron & Knight
attys.

UNITED STATES PATENT OFFICE 2,344,354

VALVE CONSTRUCTION

Harold Hallerstrom, Evanston, and Charles Letsche, Chicago, Ill., assignors to Hanna Engineering Works, Chicago, Ill., a corporation of Illinois Application January 16, 1942, Serial No. 426,972

2 Claims. (Cl. 277—71)

This invention relates to a new and improved valve construction and more particularly to valves for the purpose of controlling the rate of flow of gases or liquids in either or both directions through the valve, the control of flow in one direction being substantially independent of the control or flow in the opposite direction.

While the improved valves are capable of general application, they are of particular utility in connection with the control of apparatus such as riveters, presses or the like which are operated by fluids under pressure.

With various applications of fluid flow or pressure it is required that flow be permitted alternately or at different times in opposite directions. In many cases the flow requirements are different when the flow is in the two opposite directions. For example, it may be desired to permit free flow in one direction up to the capacity of the piping system, while it may be desired to limit or throttle flow in the opposite direction. In other cases it may be desired to throttle or limit flow in both directions but to a different extent. It has been the common practice heretofore to provide parallel pipe branches for a portion of the system and to use each branch for flow in only one direction. This has required additional piping and a separate control valve system in each branch. This requires the use both of throttling valves and check valves in each branch.

It is an object of the present invention to provide a new and improved valve of a type capable of substantially independent control of flow in opposite directions.

It is a further object to provide a single unit valve construction adapted to eliminate the necessity for double passages and valve controls for handling and controlling alternate and opposite fluid flow.

It is also an object to provide a construction in which the throttling effect is caused by a valve member operated substantially independently of the fluid flow whereby uncontrolled surges on flow reversal are eliminated.

It is an additional object to provide a valve which is simple in design and construction and adapted for commercial production.

Other and further objects will appear as the description proceeds.

We have shown a preferred embodiment of our invention in the accompanying drawing, in which—

Figure 1 is a plan view of the valve structure;

Figure 2 is an elevation of the structure of Figure 1;

Figure 3 is a view of the structure of Figure 1 as seen from the right; and

Figure 4 is a section taken on line 4—4 of Figure 1 and shown on an enlarged scale.

The valve construction comprises a valve body 11 having an offset wall 12 dividing the interior of the valve body into two chambers 13 and 14. The threaded opening 15 leads into chamber 13, while the threaded opening 16 connects to chamber 14. The lateral wall in the chamber 13 is provided with a threaded opening 17 and the chamber 14 is provided with a similar opening 18. These openings are provided in order to give access to the interior of the valve body for the purpose of machining operations, such as drilling and finishing the port 19 which passes through the wall 12, and also machining the valve seats 20 and 21 on the opposite faces of the port 19. The valve supporting gland 22 is threaded into openings 17, a washer 23, formed of any suitable material, such as lead, serving as a gasket to insure a fluid-tight closure. The valve guide member 24 is threaded into the gland 22, being held in adjusted position by means of a lock nut 25, and being adjustable by means of the squared head 26 which is formed separately from the valve guide and fixedly secured thereto. The inner end of the valve guide 24 is provided with an enlarged head 27 which limits the inward movement of the valve disc 28. This valve disc 28 is provided with a sleeve portion 29 having a sliding fit with the valve guide 24 and of adequate length to prevent binding or tilting of the valve disc upon the valve guide. The coil spring 30 bears on the inner face of the gland 22 and against the adjacent face of the valve disc 28. It surrounds the sleeve portion 29 of the valve disc.

The opening 18 is closed with a similar gland 31 having a packing 32 and carrying the valve guide 33. This valve guide 33 is provided with the adjusting head 34, the lock nut 35 and an enlarged inner end 36, being identical in construction with that shown in the upper part of the figure. The valve guide 33 also carries a valve disc 37 having a sleeve portion 38 and urged against the enlarged end 36 of the valve guide 33 by means of the coil spring 39.

The valve structure is used to control flow through the valve port 19 in opposite directions, the flow in each direction having a control substantially independent of the control of flow in the opposite direction. For example, fluid under pressure entering the left end of the valve through opening 16, enters the chamber 14 and passes upwardly through port 19. The lower valve disc 37 is shown as permanently drawn down to its limit of open adjustment, so that the port 19 is cleared for full flow from the chamber 14 into the port. The fluid flowing through the port 19 will meet the valve disc 28, but this disc is held down only by the pressure of the relatively light spring 30 so that the fluid will force this disc further away from its valve seat 20 and provide passage for the fluid into chamber 13 and out through opening 15. As soon as flow in this direction ceases, the valve disc 28 is again brought to the position in which it is shown in Figure 4, by means of the return spring 30.

When flow starts inwardly through opening 15 and into chamber 13, the flow from chamber 13 to the port 19 will be partially obstructed by valve disc 28. The flow in this direction will not tend to lift valve disc 28, but, on the other hand, to cooperate with spring 30 in retaining the disc 28 down against the enlarged head 27 of the valve stem 24. The flow in this direction is, therefore, limited by the valve disc 28, but is in no way limited by the opposite valve disc 37, since the opening between the valve disc 37 and its seat 21 greatly exceeds that between the valve disc 28 and its seat 20.

It will be apparent that each valve disc is capable of adjustment entirely independent of the other. Each valve disc serves also to control flow in one direction substantially independently of any control which is afforded by the other valve disc. If either valve disc is adjusted so that it is fully seated on its valve seat by its spring, then the valve assembly becomes a one-way check valve. This is not the normal use of the valve, since it is especially designed for two-way control. It may be used for this purpose, however, in some cases if desired, the seated valve disc absolutely preventing flow in one direction, while the other valve disc, depending on its adjusted position, has a throttling effect to limit flow in the opposite direction.

The action of the valve disc springs 30 and 39 is an important feature of this valve and gives it advantages over valves which depend on the flow of the fluid medium through the valve in reverse directions to move the valve member or members to the proper adjusted throttling position controlling flow in such reverse direction. Where no spring is provided, but the disc is flow-operated, the flow starts with a large opening at the disc, which allows undesirable surge at the beginning of flow reversal.

It will be apparent that all parts of the valve construction shown and described are symmetrical, so that operation in either direction may be similarly and identically controlled, with adjustment in either direction independent of that in the other direction. That is, the volume of flow can be adjusted from zero to full volume in either direction independently of flow in the opposite direction. The springs 30 and 39 are relatively light and designed to apply only enough pressure to move the valve disc when there is no flow pressure. This light spring pressure eliminates unwanted throttling action from the second disc, which is encountered by the flowing medium, as it pushes this disc back into the second or discharge chamber in the line of flow.

While we have shown certain preferred embodiments of our invention, it is capable of modification to meet differing conditions and requirements, and we contemplate such changes as come within the spirit and scope of the appended claims.

What is claimed is:

1. A two-way check valve construction including a substantially tubular valve body having an opening in each end thereof, a partition wall dividing the interior of the valve body into two chambers communicating with the end openings respectively, said partition wall having a valve opening therein, a valve member in each chamber disposed adjacent its respective side of the valve opening, each valve member including a disc portion for closing the valve opening and a rearwardly extending sleeve, control means for each member extending through the sleeve and disc portion thereof and having a stop to retain the valve member on the control means, means adjustably mounting each control means in the wall of the valve body, and a resilient spring encircling the sleeve of each valve member and being confined between the valve member and the valve body for yieldingly maintaining the member against its particular stop, whereby upon adjustment of each control means its particular valve member may be positioned a predetermined distance from the valve opening against the tension of said resilient means.

2. A two-way check valve construction including a substantially tubular valve body having an opening in each end thereof, a partition wall dividing the interior of the valve body into two chambers communicating with the end openings respectively, said partition wall having a valve opening therein, a valve member in each chamber disposed adjacent its respective side of the valve opening, each valve member including a disc portion for closing the valve opening and a rearwardly extending sleeve, control means for each valve member having threaded connection with the valve body and projecting from the exterior thereof, each control means extending through the sleeve and disc portion of its valve member whereby the member is mounted in a manner permitting axial movement on its control means, a stop on the inner end of each control means to retain the valve member thereon and limit movement of the same in a direction toward the valve opening, and resilient means encircling the sleeve of each valve member and being confined between the member and the valve body for yieldingly maintaining the valve member against its particular stop, whereby each control means may be adjusted to position its valve member a predetermined distance from the valve opening and whereby the valve member may be axially moved on its control means against the tension of said resilient means.

HAROLD HALLERSTROM.
CHARLES LETSCHE.